United States Patent [19]

Neumann et al.

[11] Patent Number: 5,576,108
[45] Date of Patent: Nov. 19, 1996

[54] CURING COMPONENT FOR EPOXY RESINS

[75] Inventors: Uwe Neumann, Bad Schwalbach; Claus Godau, Kiedrich, both of Germany

[73] Assignee: Hoechst Aktiengesellschaft, Frankfurt am Main, Germany

[21] Appl. No.: 301,986

[22] Filed: Sep. 9, 1994

[30] Foreign Application Priority Data

Sep. 13, 1993 [DE] Germany .................. 43 31 052.4

[51] Int. Cl.$^6$ .................. C08G 14/06; C08L 63/00; C08L 61/34
[52] U.S. Cl. .................. 428/413; 525/481; 525/482; 525/484; 525/504; 528/98; 528/99; 528/155; 564/323; 564/367; 564/388
[58] Field of Search .................. 528/155, 99, 98; 564/323, 367, 388; 428/413; 525/481, 482, 484, 504

[56] References Cited

U.S. PATENT DOCUMENTS

| | | | |
|---|---|---|---|
| 2,354,672 | 8/1944 | Eastes | 250/45 |
| 2,459,112 | 7/1945 | Oberright | 564/367 |
| 3,119,871 | 1/1964 | Boag et al. | 564/323 |
| 3,366,600 | 1/1968 | Haberlin et al. | 260/47 |
| 3,382,261 | 5/1968 | Kittredge et al. | 260/404.5 |
| 3,658,728 | 4/1972 | Hoffmann et al. | 260/2 |
| 3,751,471 | 8/1973 | Becker | 260/570.5 |
| 3,950,451 | 4/1976 | Suzuki et al. | 528/99 |
| 4,172,042 | 10/1979 | Kiisler et al. | 252/62 |
| 4,269,742 | 5/1981 | Goeke et al. | 528/96 |
| 4,481,349 | 11/1984 | Marten et al. | 528/120 |
| 5,049,641 | 9/1991 | Hood et al. | 528/155 |
| 5,098,986 | 3/1992 | Speranza et al. | 528/149 |
| 5,300,618 | 4/1994 | Durairaj | 528/98 |

FOREIGN PATENT DOCUMENTS

| | | |
|---|---|---|
| 0066447 | 12/1982 | European Pat. Off. . |
| 0114875 | 2/1989 | European Pat. Off. . |
| 0319310 | 6/1989 | European Pat. Off. . |
| 0541814 | 5/1993 | European Pat. Off. . |
| 864357 | 4/1961 | United Kingdom . |
| 886767 | 1/1962 | United Kingdom . |

OTHER PUBLICATIONS

Chemical Abstracts 112: 157851, "Preparation of Monoarylalkyphenols by Alkylation", Takagi et al.

*Primary Examiner*—Frederick Krass
*Attorney, Agent, or Firm*—Foley & Lardner

[57] ABSTRACT

Curing components containing amino groups for curing epoxy resins are obtained by the reaction of alkylated polyhydroxy aromatics (A) with polyamines (B) and aldehydes (C) by the mechanism of the Mannich reaction. The preparation of curable mixtures and varnish formulations is also disclosed. The curing components and curable mixtures can also be employed at a low temperature.

12 Claims, No Drawings

CURING COMPONENT FOR EPOXY RESINS

BACKGROUND OF THE INVENTION

1. Field of the Invention

The present invention generally relates to a curing component for epoxy resins, epoxy resins containing the curing component and to the use thereof.

2. Description of Related Art

It is known that alcohols, in particular phenol or alkylated phenols, accelerate the curing reaction between oxiranes and amino groups (cf. U.S. Pat. No. 3,366,600 and DE-A 17 70 832). It has proven advantageous in these processes to combine the phenol component together with the amine component in one molecule. In DE-A 15 43 754, a hydroxyaryl-substituted aliphatic carboxylic acid is linked with a polyamine via an amide bond for this purpose. In this process, however, one amino group of the polyamine, which is required for the amide bond, is lost to the curing operation.

DE-A 32 33 565 and EP-B 0 114 875 therefore propose, as the curing component, the reaction product of a Mannich reaction of aldehydes and polyamines with phenol or alkylphenols, for example cresols, p-tert-butylphenol or nonylphenol, and EP-A 0 066 447 also with arylphenols, for example benzylphenol.

These combinations have proven suitable, but the combinations also display disadvantages, such as, a lack of acceleration at low temperatures ($\leq 10°$ C.) and under high atmospheric humidity. These combinations also exhibit a lack of resistance to dilute organic acids, for example acetic acid. Since phenol or alkylated phenols are contained in all of these combinations, they are also of only limited applicability from the toxicological point of view, because of the risk to the user during application. Furthermore, for example, the phenols are easily extracted from the coating on contact with foods, due to the aqueous-dilute organic acids contained therein, such as acetic acid, tartaric acid or citric acid, and spoil the food.

DE-B 10 43 629 also mentions polyhydric phenols, in addition to the customary phenolic components, as possible reactants for curing components which can be prepared by the Mannich reaction. Compounds such as resorcinol and hydroquinone, however, give highly crosslinked Mannich bases of undesirably high viscosity because of their high reactivity. Moreover, the increased polarity of polyhydric phenols, compared with monohydric phenolic components, causes relatively severe blushing of coatings produced from curable mixtures comprising polyhydric phenols.

SUMMARY OF THE INVENTION

One object of the present invention is to provide curing components for epoxy resins, the accelerating groups of which are incorporated in a high proportion into the network, so that their extraction by aqueous-dilute organic acids is largely avoided. Another object is to provide curing components which are also sufficiently reactive at low temperatures and high atmospheric humidity.

Still another object is to provide a curing component having a relatively low viscosity and hydrophobic properties in order to overcome the problems which occur, in particular during coating, at low temperatures and high atmospheric humidity. Such problems include blushing, smeared surfaces and inadequate crosslinking, which are to be attributed to reaction of the amino group in the curing agent with water vapor and carbon dioxide from the air.

Another object of the present invention is to provide an epoxy resin mixture which contains the curing component. Still another object of the present invention is to provide a process for making the curing component and the curing component produced by the process. Yet another object of the invention is to provide an article which is coated with a varnish which contains the curing component.

In accomplishing the foregoing objects, there has been provided according to the present invention a process for producing an amino group containing a curing component for epoxy resins, and the curing component produced therefrom. The process includes reacting an alkylated polyhydroxy aromatic, a polyamine and an aldehyde, by the Mannich reaction.

There has also been provided according to another aspect of the present invention an epoxy resin mixture which includes an epoxy resin, the curing component according to the present invention and optionally diluents and/or additives. Still another aspect of the present invention provides a varnished object which includes a substrate at least partially coated with a varnish which contains an epoxy resin and the curing component of the present invention.

Further objects, features and advantages of the present invention will become apparent from the detailed description of preferred embodiments which follows.

DETAILED DESCRIPTION OF THE PREFERRED EMBODIMENTS

The present invention thus relates to a curing component comprising amino groups. These curing components are preferably used for compounds which contain oxirane groups, usually called epoxy resins. The curing component is preferably obtainable by the reaction of alkylated polyhydroxy aromatics (A) with polyamines (B) and aldehydes (C) by the mechanism of the Mannich reaction.

The present invention furthermore relates to the use of the curing component in curable mixtures, in particular paint formulations, and to curable mixtures which comprise the curing component.

Although any alkylated polyhydroxy aromatic (A) can be used, especially suitable alkylated polyhydroxy aromatics (A) are, according to the present invention, preferably compounds which can be prepared by acid catalysis from a corresponding polyhydroxy aromatic (a1) and an unsaturated compound (a2) which carries at least one olefinic double bond.

The alkylation reduces the viscosity of the curing component, and greatly decreases the ability of the alkylated polyhydroxy aromatic (A) to dissolve out of the coating with dilute aqueous acid because of the increase in the hydrophobic character and substantial incorporation into the network. Furthermore, even under critical conditions, such as high atmospheric humidity and low temperatures, completely cured films having a good gloss and flow are already obtained after 24 hours.

The term polyhydroxy aromatic (a1) is defined as meaning compounds which carry at least two hydroxyl groups on one aromatic ring, for example on the benzene ring. Although any suitable polyhydroxy aromatic can be used, preferred compounds here are hydroquinone, pyrocatechol, resorcinol, pyrogallol, phloroglucinol and novolaks of the above-mentioned polyhydroxy aromatics with formaldehyde. Resorcinol and novolaks based on resorcinol and formaldehyde are especially preferred. When novolaks are used, the molar ratio of resorcinol to formaldehyde is preferably about 2.0:5.0 to about 2.0:1.0; however, any suitable range can be used.

The polyhydroxy aromatics can be used in the present invention individually or as a mixture.

Possible unsaturated compounds (a2) are, for example: olefins, such as 1-hexene, 1-heptene, higher homologs thereof and isomers thereof, and cyclohexene, cyclopentadiene, indene, styrene, o/m/p-vinyltoluene, 2-phenylpropene, 1,3-divinylbenzene and 1,3-bis(2propenyl)benzene, indene, styrene and 2-phenylpropene being preferred. However, other suitable unsaturated compounds can be used, and are not limited to those above. The unsaturated compounds can also be employed individually or as a mixture.

The alkylated polyhydroxy aromatic (A) is preferably prepared by acid catalysis in the melt from the unsaturated compound (a2) and the polyhydroxy aromatic (a1). The molar ratio of components (a1) and (a2) in general here is about 1.0:0.1 to about 1.0:3.0, preferably about 1.0:0.8 to about 1.0:1.8, more preferably about 1.0:1.0 mol to about 1.0:1.75 mol. While any suitable temperature can be used, the preferred temperature during the synthesis is about 80° C. to about 220° C., and a range from about 120° C. to about 160° C. is particularly preferred. The acids which catalyze the process described above are preferably the known catalysts for Friedel-Crafts alkylation, for example concentrated sulphuric acid, p-toluene-sulphonic acid, boron trifluoride-ether complexes, or other boron trifluoride complexes, tin(IV) chloride, 85% strength phosphoric acid, oxalic acid and any other suitable acid. The concentration of the catalyzing acid, based on the total amount of (a1) and (a2) is preferably about 0.01 to about 5 percent by weight.

The preparation process is preferably carried out, for example, such that the polyhydroxy aromatic (a1) is initially introduced to the reaction vessel with the catalyst, and the unsaturated compound (a2) is metered in at the above-mentioned temperature. A process for the preparation of alkylated polyhydroxy aromatics (A) is described, for example, in EP-A 0 319 310 which is hereby incorporated by reference in its entirety. Although the above process is preferred, any other suitable reaction can be used.

If novolaks are used, these can be preferably prepared separately in a preliminary stage or in parallel with the alkylation, by adding a formalin solution to the reaction mixture, in addition to the unsaturated compound (a2).

A reaction for the preparation of such novolaks is described, for example, in U.S. Pat. No. 5,049,641 which is hereby incorporated by reference in its entirety.

Although any alkylated polyhydroxy aromatic (A) suitable for the reaction product of the curing component can be used, the following alkylated polyhydroxy aromatics (A) are preferably used: reaction products of styrene and resorcinol, 2-phenylpropene and resorcinol, dodecene and resorcinol, and indene and resorcinol, styrene and pyrocatechol, 2-phenylpropene and pyrocatechol, hexene and pyrocatechol, indene and pyrocatechol, mixed alkylation products of styrene, dodecene and resorcinol, of styrene, divinylbenzene and resorcinol, of indene, styrene and resorcinol, of indene, dodecene and resorcinol, of styrene, formaldehyde and resorcinol, of 2-phenylpropene, dodecene and resorcinol, of 2-phenylpropene, indene and resorcinol, of styrene, dodecene and pyrocatechol, of styrene, divinylbenzene and pyrocatechol, of indene, styrene and pyrocatechol, of indene, dodecene and pyrocatechol, of 2-phenylpropene, dodecene and pyrocatechol, and of 2-phenylpropene, indene and pyrocatechol, reacted with one another in the above-mentioned molar ratios.

The polyamine (B) is distinguished by the fact that it preferably carries at least two primary aliphatic amino groups. It can also carry further amino groups having a primary, secondary or tertiary character. Furthermore, polyaminoamides and polyalkylene oxide-polyamines or amine adducts, such as amine-epoxy resin adducts, are also suitable.

Examples of suitable polyamines are: 1,2-diaminoethane, 1,2-diaminopropane, 1,3-diaminopropane, 1,4-diaminobutane and higher homologs, as well as 2-methyl-1,5-diamnopentane, 1,3-diaminopentane, 2,2,4-trimethyl-1,6-diaminohexane, 2,4,4-trimethyl-1,6-diaminohexane, 1-amino-3-aminomethyl-3,5,5-trimethylcyclohexane, 2,2-dimethyl-1,1,3-diaminopropane, 1,3-bis(aminomethyl)cyclohexane, 1,2-diaminocyclohexane, 1,3-bis(aminomethyl)benzene, bis(4-aminocyclohexyl)methane, bis(4-amino-3-methylcyclohexyl)methane, 3-azapentane-1,5-diamine, 4-azaheptane-1,7-diamine, 3,6-diazoctane-1,8-diamine, 3(4), 8(9) -bis (aminomethyl) tricyclo[5.2.1.0$^{2,6}$]-decane, 3-methyl-3-azapentane-1,5-diamine, Jeffamine®D-230, Jeffamine®D-400, Jeffamine®T-403 (products of the Texaco Chemical Company) and 2-butyl-2-ethyl-1,1,5-diaminopentane. Araliphatic polyamines in which the aliphatic carbon atoms carry the amino groups, such as 1,3-bis(aminomethyl)benzene and mixtures of 1,3-bis(aminomethyl)benzene and other polyamines, are preferred. However, any other suitable polyamine (B) for the reaction product of the curing component can be used.

Primary aliphatic aldehydes, for example acetaldehyde, propionaldehyde and isobutyraldehyde, and preferably formaldehyde, are in general employed as the aldehyde (C). However, any other suitable aldehyde (C) for the reaction product of the curing compound can be used.

The Mannich reaction of the alkylated polyhydroxy aromatic (A) with the polyamine (B) and the aldehyde (C) proceeds according to generally known processes (cf. EP-B 0 114 875, EP-A 0 066 447, DE-A 32 33 565 and DE-C 20 25 343 the disclosures of which are incorporated herein in their entirety). In this reaction, the melt of the alkylated polyhydroxy aromatic (A) is preferably taken up by the polyamine (B) at about 100 to about 140° C. Preferably, about a 30 to about a 44 % strength formalin solution is then added in portions, preferably at about 70° to about 120° C., in particular at about 90° to about 110° C., with water being distilled off at the same time. The residual water is then distilled off under reduced pressure (typically about 50 to about 200 mbar), preferably at about 100° to about 130° C. The molar ratio of components (A), based on the moles of polyhydroxy aromatic (a1) employed, to (B) is preferably about 0.1:2.0 to about 2.0:1.0, in particular about 0.2:1.0 to about 0.75:1.0. The ratio of components polyamine (B) to aldehyde (C) is preferably about 1.0:0.1 to about 1.0:2.0, in particular about 1.0:0.2 to about 1.0:0.5.

Primary, aliphatic monoamines can additionally also be added to the curing component according to the present invention. Such monoamines are, for example, unbranched 1-amino-alkanes having an alkyl radical of 6 to 18 carbon atoms. Other suitable unbranched monoamines can also be used. The higher representatives of this class of compound are also called fatty amines. However, any suitable monoamines having branched chains are also possible. Examples are 2-ethylhexane-1-amine or 3,5,5-trimethylhexane-1-amine. They can be employed here individually or as a mixture, and in particular together preferably in an amount of about 0.1 to about 10 percent by weight based on the Mannich base described above, in particular in an amount of about 1 to about 5 percent by weight. The addition of such primary aliphatic amines furthermore reduces the risk of blushing, in particular when the curable mixtures according to the invention are used for the production of coatings at a low temperature.

The curing component according to the present invention can be used for the preparation of curable mixtures, in particular coating formulations.

The curable mixtures according to the present invention comprise the curing component according to the present invention, an epoxy resin, if appropriate a diluent which is inert toward amines and epoxides under the conditions according to the invention, and if appropriate customary additives.

Examples of preferred diluents which may be mentioned are: ethers, such as dibenzyl ether, tetrahydrofuran, 1,2-dimethoxyethane or methoxybenzene; ketones, such as butanone, cyclohexanone, methyl isobutyl ketone and the like; alcohols, such as methanol, ethanol, 2-propanol, benzyl alcohol, furfuryl alcohol and others; hydrocarbons, such as toluene, xylene, heptane and mixtures of aliphatic and aromatic hydrocarbons having a boiling range above 100° C. under normal pressure, and low-viscosity cumarone-indene resins or xylene-formaldehyde resins. Aliphatic alcohols with a phenyl radical, such as benzyl alcohol, 1-phenoxypropane-2,3-diol, 3-phenyl-1-propanol, 2-phenoxy-1-ethanol, 1-phenoxy-2-propanol, 2-phenoxy-1-propanol, 2-phenylethanol, 1-phenyl-1-ethanol or 2-phenyl-1-propanol are especially preferred. The diluents can be employed here individually or as a mixture. However, any diluent which is inert toward amines and epoxides under the conditions according to the present invention may also be used.

Depending on the particular intended use, customary additives may optionally additionally be present in the curable mixture according to the present invention. Examples of such additives are the customary paint additives, such as pigments, pigment pastes, antioxidants, flow and thickening agents, foam suppressants, catalysts, additional hardeners and additional curable compounds. If appropriate, these additives do not have to be added to the mixture until immediately before processing. The above additives are shown as examples only, and should not be interpreted as limiting the additives which can be added.

To prepare the curable mixtures according to the invention, the curing component according to the invention is mixed with epoxy resin and, if appropriate, diluent and customary additives. In the case of components of low viscosity, the diluent can be dispensed with and mixing can be carried out in bulk, the mixture being heated to higher temperatures, if appropriate. Products of higher viscosity are dissolved or dispersed in the diluents mentioned above, before mixing.

Any known epoxy resins can be cured by the curing components according to the invention. Examples are those based on 2,2-bis(4-hydroxy-phenyl)propane, bis(hydroxyphenyl)methane, polypropylene glycols, novolaks of phenol, cresols, p-tert-butylphenol, nonylphenol and formaldehyde, each by itself or as a mixture, and resins diluted with so-called reactive diluents. Reactive diluents are, for example, the glycidyl ethers of the following alcohols: 1,5-hexanediol, 1-4-butanediol, p-tert-butylphenol, o-cresol, phenol and straight-chain monoalcohols having more than 8 carbon atoms. Solid epoxy resins based on the above-mentioned phenols can also be cured with the curing component according to the invention if they are dissolved in a suitable solvent beforehand. A detailed list of suitable epoxy compounds can be found in the handbooks *Epoxidverbindungen und Harze* (Epoxy Compounds and Resins) by A. M. Paquin, Springer Verlag, Berlin 1958, Chapter IV, which is hereby incorporated by reference in its entirety; and *Handbook of Epoxy Resins* by H. Lee, K. Neville, McGraw-Hill Book Company, New York, 1982 reissue, which is hereby incorporated by reference in its entirety; and *Epoxy Resins—Chemistry and Technology* by C. A. May, Marcel Dekker Inc., New York and Basel 1988, which is hereby incorporated by reference in its entirety.

Because of their favorable properties, especially because of their rapid drying even at low temperatures and also at high atmospheric humidity with incorporation of the hardener (or curing component) into the network, the curable mixtures according to the invention can also find diverse technical uses. Such uses include, for example, the production of shaped articles (casting resin) for tool production or for the production of coatings and/or intermediate coatings on many types of substrates, for example on those of an organic or inorganic nature, such as wood, wood fiber materials (wood sealing), textiles of natural or synthetic origin, plastics, glass, ceramic, building materials, such as concrete, fiber boards and artificial stones, but in particular on metal.

The curable mixtures according to the present invention can furthermore be employed as constituents of adhesives, putties, laminating resins and synthetic resin elements, and in particular as constituents of paints and varnishes for industrial objects, domestic appliances, furniture and in the building industry, such as, for example, refrigerators, washing machines, electrical appliances, windows and doors. They can be applied, for example, by brushing, spraying, dipping and the like. A preferred field of use for the mixtures according to the invention is that of coating formulations. The above uses are just a few examples of the possible uses of the invention, and should not be construed in any way as limiting the use of the present invention.

Curing of the mixtures according to the invention proceeds very rapidly and generally takes place at about −10° C. to about +50° C., preferably about 0° C. to about 40° C. For example, products of good hardness are achieved at as low as about 5° C. and a relative atmospheric humidity of about 95% after about 8 to about 24 hours, or at room temperature after just about 1 to about 4 hours. The high level of resistance to water already shortly after curing, for example after hardening at about +5° C. and a relative atmospheric humidity of more than about 90% for about 24 hours, is to be emphasized.

I. Preparation of the Curing Component

In the following examples, percentages are in each case percentages by weight and parts are in each case parts by weight. HEV is hydrogen equivalent weight. This value, the amine number and the yield in the following examples are always based on the mixture of curing component including additives.

EXAMPLE 1

110 parts of resorcinol are heated to 130° C. with 2 parts of p-toluenesulfonic acid monohydrate. 104 parts of styrene are added at this temperature in the course of 60 minutes. The mixture is then heated at 150° C. for a further 120 minutes. After cooling to 120° C., the melt is taken up in 270 parts of 1,3-bis(aminomethyl)-benzene and 30 parts of trimethylhexane-1,6-diamine, a commercially obtainable mixture of 2,2,4-trimethyl-1, 6-diaminohexane and 2,4,4-trimethyl-1-6,diaminohexane (Hüls AG). 41.5 parts of a 36.5% strength formalin solution are added drop by drop at 90° to 95° C. in the course of 90 minutes. After the end of the addition, the mixture is kept at 105° C. for 120 minutes. Water is distilled off at 110° C. under an increasing vacuum. As soon as 50 mbar is reached, the temperature is increased to 130° C. and the mixture is kept under 50 mbar for 60 minutes. Finally, the mixture is taken up in 65 parts of 3-phenylpropan-1-ol and 20 parts of Armeen® OD (Oleylamine/Akzo Chemicals).

| Amine-number: | 409 |
|---|---|
| HEV: | 73 |
| Viscosity at 25° C.: | 1,900 Mpa · s |

EXAMPLE 2

90 parts of resorcinol and 20 parts of 1,5-dihydroxynaphthaline are heated to 130° C. with 2 parts of p-toluenesulfonic acid monohydrate. 130 parts of 2-propenylbenzene are added at this temperature in the course of 60 minutes. The mixture is then heated at 150° C. for a further 120 minutes. After cooling to 120° C., the melt is taken up in 370 parts of 1,3-bis(aminomethyl)benzene. 53 parts of a 36.5% strength formalin solution are added dropwise at 90° to 95° C. in the course of 90 minutes. After the end of the addition, the mixture is kept at 105° C. for 120 minutes. Water is distilled off at 110° C. under an increasing vacuum. As soon as 50 mbar is reached, the temperature is increased to 130° C. and the mixture is kept under 50 mbar for 60 minutes. Finally, it is taken up in 12 parts of Genamin®CC100D ($C_{12}$-fatty amine/Hoechst AG) and 75 parts of benzyl alcohol.

| Amine number: | 438 |
|---|---|
| HEV: | 68 |
| Viscosity at 25° C.: | 2,100 mPa · s |

EXAMPLE 3

110 parts of resorcinol are heated to 130° C. with 5 parts of oxalic acid. 150 parts of 2-propenylbenzne are added at this temperature in the course of 60 minutes. The mixture is then heated at 150° C. for a further 120 minutes. After cooling to 120° C., the melt is taken up in 365 parts of 1,3-bis(aminomethyl)benzene. 45 parts of a 36.5% strength formalin solution are added dropwise at 90° to 95° C. in the course of 90 minutes. When the addition has ended, the mixture is kept at 105° C. for 120 minutes. Water is distilled off at 110° C. under an increasing vacuum. As soon as 50 mbar is reached, the temperature is increased to 130° C. and the mixture is kept under 50 mbar for 60 minutes. Finally, the mixture is taken up in two parts of Lipinol® T (benzylated toluene/Hüls AG), 23 parts of n-octylamine and 90 parts of 3-phenylpropanol.

| Amine number: | 413 |
|---|---|
| HEV: | 72 |
| Viscosity at 25° C.: | 1,400 mPa · s |

EXAMPLE 4

102 parts of resorcinol and 8 parts of hydroquinone are heated to 130° C. with 5 parts of oxalic acid. A mixture of 125 parts of styrene and 16 parts of 1,3-bis(2-propylene) benzene is added at this temperature in the course of 60 minutes. The mixture is then heated at 150° C. for a further 120 minutes. After cooling to 120° C., the melt is taken up in 310 parts of 1,3-bis(aminomethyl)benzene and 20 parts of trimethylhexane1,6-diamine, a commercially obtainable mixture of 2,2,4-trimethyl-1,6-diaminohexane and 2,4,4-trimethyl-1,6-diaminohexane (Hüls AG). 65 parts of a 36.5% strength formalin solution are added dropwise at 90° to 95° C. in the course of 90 minutes. When the addition has ended, the mixture is kept at 105° C. for 120 minutes. Water is distilled off at 110° C. under an increasing vacuum. As soon as 50 mbar is reached, the temperature is increased to 130° C. and the mixture is kept under 50 mbar for 60 minutes. Finally, the mixture is taken up in 66 parts of benzyl alcohol and 20 parts of n-octylamine.

| Amine number: | 404 |
|---|---|
| HEV: | 81 |
| Viscosity at 25° C.: | 3,200 mPa · s |

EXAMPLE 5

100 parts of resorcinol and 120 parts of xylene are heated to 120° C. with 1 part of boron trifluoride-acetic acid complex. 24 parts of a 36.5% strength formalin solution and 80 parts of styrene are simultaneously added at this temperature. After the addition, water is distilled off azeotropically by means of xylene. The mixture is neutralized with 260 parts of 1,3-bis(aminomethyl)benzene. A second addition of 8 parts of a 36.5% strength formalin solution is carried out at 90°to 105° C., water being distilled off azeotropically. After the addition, water and xylene are distilled off at a maximum of 120° C. under an increasing vacuum. As soon as 50 mbar is reached, the mixture is kept under 50 mbar for 60 minutes.

Finally, the mixture is taken up in 16 parts of dodecylamine and 70 parts of benzyl alcohol.

| Amine number | 412 |
|---|---|
| HEV: | 69 |
| Viscosity at 25° C.: | 4,300 mPa · s |

Comparison hardener (curing component)
CE1: 1,3:-bis(aminomethyl)benzene (HEV 34).
CE2: Beckopox® EH 629 (Mannich base from phenol, contains more than 10% of free phenol, HEV 70/Hoechst AG).

II. Preparation of the Curable Mixtures and Use Testing of the Curing Product

Coatings are produced in the following manner with the products and comparison products mentioned under I and an epoxy resin, and are evaluated for their use properties. 100 g of a low molecular weight epoxy resin based on bisphenol A and having a viscosity of about 10 Pas/25° C. and an epoxide equivalent of 183 (Beckopox® EP 140/Hoechst AG) are mixed with the amount of the particular hardener (curing componeht) corresponding to the hydrogen equivalent, and two films of 200 μm thickness are drawn on in each case two glass plates. One plate is stored at 23° C. and 40 to 50% relative atmospheric humidity for 24 hours, and the other plate is stored at +5° C. and >95% relative atmospheric humidity for 24 hours. The films are tested for tackiness, cloudiness, hardness and sensitivity to water. Thereafter, the coated plates are placed in a water bath (water temperature between 10° and 15° C.) for 30 minutes and, after drying off, the change (clouding) of the film and its hardness are evaluated.

As can be seen from Table 1, the coatings produced with the curing agents (components) according to the present invention show a perfect surface nature, while a more or less severe clouding is found with the comparison examples. This clouding is another indicator of further disadvantages of conventional curing agents which the curing agents according to the present invention do not show and therefore further demonstrate the superiority of the present invention as compared to the conventional curing agent.

Carbonate or carbamate formation causes clouding in the conventional films. The intermediate adhesion of another layer applied on top of the cloudy layer will be disturbed considerably by the carbonate or carbamate formation. Also, the crosslinking density in the cured film and therefore the resistance to chemicals is reduced by the carbonate or carbamate formation, since points of attack for chemicals such as dilute organic acids are formed.

Other embodiments of the invention will be apparent to those skilled in the art from consideration of the specification and practice of the invention disclosed herein. It is intended that the specification be considered as exemplary only, with the true scope and spirit of the invention being indicated by the following claims.

TABLE 1

Use Tests

| | Example 1 | Example 2 | Example 3 | Example 4 | Example 5 | Comparison E1 | Comparison E2 |
|---|---|---|---|---|---|---|---|
| HEV | 73 | 68 | 72 | 81 | 69 | 34 | 70 |
| pot life in minutes | 22 | 17 | 15 | 17 | 19 | 116 | 19 |
| pendulum hardness at room temp. 1 day | 194 sec | 200 sec | 206 sec | 191 sec | 197 sec | 179 sec | 189 sec |
| pendulum hardness at room temp. 7 days | 196 sec | 203 sec | 213 sec | 197 sec | 209 sec | 187 sec | 194 sec |
| pendulum hardness after caring for 1 day at 5° C. and 95% relative humidity | 83 sec | 91 sec | 93 sec | 67 sec | 80 sec | 41 sec | 89 sec |
| surface after hardening at room temp. for 1 day* | 0 tack-free, clear | 0 tack-free, clear | 0 tack-free, clear | 0 tack-free, clear | 0 tack-free, clear | 2 tack-free, cloudy | 0 tack-free, clear |
| surface after hardening at 5° C. for 1 day* | 0 tack-free, clear | 0–1 tack-free, clear | 0–1 tack-free, clear | 0 tack-free, clear | 0–1 tack-free, clear | 4 soft, cloudy | 2 tack-free, slightly cloudy |
| surface after hardening at room temp. for 1 day + water at room temp. for 1 hour* | 0 tack-free, clear | 0–1 tack-free, clear | 0–1 tack-free, clear | 0 tack-free, clear | 0–1 tack-free, clear | 5 very cloudy | 3 blushes |
| surface after hardening at 5° C. for 1 day + water at room temp. for 1 hour* | 0–1 very slight blushing | 0–1 very slight blushing | 0–1 very slight blushing | 0–1 very slight blushing | 0–1 very slight blushing | 5 very cloudy | 4 blushes |

*For example, cloudy, tacky, matt, rough, uneven flow and the like. Evaluation: 0(good)–5(poor)

What is claimed is:

1. A process for producing an amino group-containing curing component for epoxy resins, comprising reacting
   (A) a polyhydroxy aromatic which is produced by an acid catalysis reaction of
      (1) at least one compound selected from the group consisting of styrene and 2-phenyl propene, and
      (2) a polyhydroxy aromatic compound selected from the group consisting of hydroquinone, resorcinol, pyrogallol, phloroglucinol and novolaks of these compounds with formaldehyde,
   (B) a polyamine which comprises at least one of 1,3-bis(aminomethyl)benzene or a mixture of 1,3-bis(aminomethyl)benzene with another polyamine and
   (C) an aldehyde
by the Mannich reaction.

2. An amino group-containing curing component for epoxy resins, made by reacting
   (A) a polyhydroxy aromatic which is produced by an acid catalysis reaction of
      (1) at least one compound selected from the group consisting of styrene and 2-phenyl propene, and
      (2) a polyhydroxy aromatic compound selected from the group consisting of hydroquinone, resorcinol, pyrogallol, phloroglucinol and novolaks of these compounds with formaldehyde,
   (B) a polyamine which comprises at least one of 1,3-bis(aminomethyl)benzene or a mixture of 1,3-bis(aminomethyl)benzene with another polyamine and
   (C) an aldehyde
by the Mannich reaction.

3. A process for producing a curing component as claimed in claim 1, wherein the molar ratio of the polyhydroxy aromatic and compound acid is about 1.0: 0.1 to about 1.0: 3.0.

4. A process for producing a curing component as claimed in claim 1, wherein the other polyamine comprises at least two primary amino groups, with each of the primary amino groups being bonded to an aliphatic carbon atom.

5. A process for producing a curing component as claimed in claim 1, wherein the aldehyde comprises formaldehyde.

6. A process for producing a curing component as claimed in claim 1, wherein the polyhydroxy aromatic is one or more compound selected from the group consisting of resorcinol and a novolak based on resorcinol and formaldehyde.

7. A process for producing a curing component as claimed in claim 1, wherein the molar ratio of the alkylated polyhydroxy aromatic, based on the moles of polyhydroxy aromatic used in the acid catalysis reaction to the polyamine is about 0.1: 2.0 to about 2.0: 1.0.

8. A process for producing a curing component as claimed in claim 1, wherein the molar ratio of the polyamine to the aldehyde is about 1.0:0.1 to about 1.0: 2.0.

9. A process for producing a curing component as claimed in claim 1, wherein the polyamine comprises a mixture of 1,3-bis(aminomethyl)benzene with another polyamine.

10. A curing component as claimed in claim 2, wherein the other polyamine comprises at least two primary amino groups, with each of the primary amino groups being bonded to an aliphatic carbon atom.

11. A curing component as claimed in claim 2, wherein the aldehyde comprises formaldehyde.

12. A curing component as claimed in claim 2, wherein the polyhydroxy aromatic is one or more compound selected from the group consisting of resorcinol and a novolak based on resorcinol and formaldehyde.

* * * * *